Patented Jan. 16, 1951

2,538,007

UNITED STATES PATENT OFFICE 2,538,007

STABILIZATION OF BROWN RICE

Ernest B. Kester, Berkeley, Calif., assignor to the United States of America as represented by the Secretary of Agriculture No Drawing. Application November 12, 1948, Serial No. 59,784

9 Claims. (Cl. 99—153)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to the stabilization of brown rice. It particularly relates to the prevention of rancidity in brown rice.

By the expression "brown rice" is meant rice in a hulled condition, consisting of the endosperm, the germ, and the bran layers. The name brown rice is, of course, derived from the fact that the bran layers are brown.

Brown rice is a valuable foodstuff because of the presence of vitamins of the B group, particularly thiamine, and other important diet factors which are not present in polished rice. However, the use of brown rice has never become general, due to the fact that this article develops an unpleasant, rancid odor in a very short time, in a matter of weeks in the warmer climates.

An object of this invention is to provide methods of treating brown rice to prepare a stabilized brown rice—a product which does not become rancid on storage. Further objects of this invention will be obvious from the description herein.

It has now been determined that the naturally-occurring oil content of brown rice is present therein in two separate and distinct fractions. One fraction of the oil content is distinguished in that it can be removed from the brown rice by extracting the brown rice in its whole state with a fat solvent. This fraction is herein designated as the free or extractable oil. The other fraction of the oil content is distinguished in that it cannot be removed by extracting the brown rice in the whole state with a fat solvent but its removal requires that the brown rice be first ground and then extracted with a fat solvent. This fraction is herein designated as the residual oil. It has also been found that the free oil and the residual oil are entirely distinct in their susceptibility to deterioration, i. e., development of rancidity. Thus the free oil as it occurs in the rice is very unstable and deteriorates rapidly. This material is thus the agent which is primarily responsible for the development of rancidity in brown rice. Upon storage of this grain, the free oil therein becomes rancid thus destroying the palatability thereof. On the other hand, the residual oil per se is relatively stable and does not deteriorate materially upon storage. Although the residual oil is relatively stable when it alone is in the grain, its stability is decreased by the presence of the free oil. Thus is has been found that if brown rice is stored until it has developed rancidity, the free oil therein is primarily responsible for the deterioration as it has largely been converted into free fatty acids. Further, this deterioration has influenced the residual oil and thus this latter fraction was found to be deteriorated to a substantial extent. Thus it is evident that the free oil in the grain has a dual role: (1) it is unstable itself and deteriorates rapidly and (2) it causes the normally-stable residual oil to rancidify to a substantial extent.

The problem of deterioration of brown rice has been solved by subjecting the same in the whole state to extraction with a fat solvent before it is subjected to storage. By this procedure the unstable free oil is removed and the so-treated brown rice is rendered stable. The fact that brown rice can be rendered stable by this simple and direct procedure is especially surprising because the free oil when isolated from the rice is not unstable. Samples of isolated free oil have been stored in open dishes at room temperature and analyses after weeks of such storage indicated no rise in free fatty acid content. In the extraction of the whole grain, the residual oil is not removed by such treatment but remains therein. It does not have any adverse effect as it is stable and moreover it contributes to the nutritive value of the product. It is also to be emphasized that thiamine is not removed when the brown rice is treated in accordance with this invention.

The extraction of the brown rice can be carried out in any of the usual methods known to those skilled in the art. For example, the cereal may be placed in a cylinder and the solvent circulated through it. Preferably, the grain is extracted with several separate batches of solvent using for the preliminary extractions a solvent which has been previously used and is rich in oil. Subsequent washes are made with solvent batches containing lower concentration of oil and the final extraction made with fresh solvent. In this manner the solvent is used most efficiently. The solvent batches which contain high concentration of oil can then be cycled to a fat recovery still, then recycled to be used as fresh solvent. Suitable solvents are benzene, carbon tetrachloride, butane, hexane, octane, and mixtures of hydrocarbons such as gasoline, petroleum ether, Stoddard solvent, benzine, naphtha, and other fat solvents. In general it is preferred to use petroleum ether or other light petroleum fractions.

After draining the solvent from the brown rice, residual solvent is removed by exposing the grain to air to allow evaporation of all solvent. This process may be hastened by passing a stream of air, preferably heated, through the mass of extracted grain until the residual solvent is completely evaporated.

The following examples disclose steps and conditions within the scope of this invention. These examples are given only by way of illustration and not limitation.

*Example I*

A 2.5 kg. sample of brown rice drawn from low temperature (−30° F.) storage was extracted without grinding at room temperature with 3 liters of petroleum ether. This extraction removed 40% of the total oil in the rice and amounted to 0.985% of the brown rice itself. The oil extracted in this operation had a free fatty acid content of 4.48%. After draining off excess solvent and air drying to remove traces of solvent, the extracted rice was placed in tightly closed glass containers which were stored at room temperature alongside other glass containers containing unextracted rice (control) from the same lot as above.

After storage for a period of 80 days, the sample of extracted rice was found to have a very mild and pleasing odor, whereas the unextracted (control) rice had an unpleasant, sour smell indicative of rancidity.

The samples of extracted and unextracted rice were also subjected to chemical tests to determine the efficacy of the stabilization process. The tests involved extraction of oil from the samples and analyses thereof to determine the free fatty acid content thereof, the point being that free fatty acid content is an index of the degree of deterioration.

The sample of the stored, extracted rice was ground and then extracted with petroleum ether to remove the residual oil. The residual oil was obtained in a yield of 1.14% and had a free fatty acid content of 3.73%.

The sample of the stored, unextracted rice (control) was first extracted without grinding with petroleum ether and yielded 0.62% of oil having a free fatty acid content at 66.5%. The sample was then ground and extracted with petroleum ether. This treatment yielded 1.51% of oil having a free fatty acid content of 22.3%.

*Example II*

A sample of fresh brown rice was subjected to chemical analyses and found to contain 3.12% free fatty acids in the free oil fraction and 2.02% free fatty acids in the residual oil fraction.

One kilogram of fresh brown rice from the same batch as above was extracted in its whole state with one liter of boiling hexane. Excess solvent was removed by draining and air drying. The extracted grain was then stored in loosely covered dishes at room temperature along with similar vessels containing unextracted rice as a control.

After storage for 4 weeks, the sample of extracted rice was found to have a very mild and pleasing odor whereas the unextracted rise had an unpleasant sour smell. Odor tests conducted on the samples by a compentent appraisal panel using the triangle method (Bengtsson, K. and Helm, E., "Principles of Taste Testing," Wallerstein Lab. Comm., 9, 171 (1946)) established the fact that the extracted brown rice after storage was the equivalent of unstored, unextracted rice and definitely more acceptable than the control sample.

The sample of the stored, extracted rice was ground and then extracted to remove the residual oil which was found to contain 3.81% free fatty acids.

The sample of the stored, unextracted rice (control) was extracted without grinding to remove the free oil which had a free fatty acid content of 16.8%.

*Example III*

A sample of fresh brown rice was subjected to chemical analysis and found to contain 4.38% free fatty acid in the free oil and 2.55% free fatty acid in the residual oil fraction.

Two and one-half kilograms of fresh brown rice from the same batch as above was extracted in its whole state with 3 liters of petroleum ether at room temperature. Excess solvent was removed by draining and air drying. The extracted grain and samples of the untreated grain (control) were stored in open jars for one month at McAllen, Texas, where the temperature varied from 75° to 103° F. over the period.

After the storage period, the sample of extracted rice was found to have a mild and pleasing odor whereas the control had a sour, unpleasant smell.

The sample of the stored, extracted rice was ground and then extracted to remove residual oil which was found to contain 4.77% free fatty acid.

The sample of the stored, unextracted rice (control) was extracted without grinding to remove the free oil which had a free fatty acid content of 67.9%. Extraction after grinding was carried out to separate the residual oil which had a free fatty acid content of 28.3%.

By computation, it was determined that the stored, extracted rice contained a total of 62.5 mg. free fatty acids per 100 g. of rice whereas the stored, unextracted rice (control) contained 946 mg. free fatty acids per 100 g. of rice.

Having thus described my invention, I claim:

1. The method of stabilizing brown rice which comprises extracting whole brown rice with a fat solvent to remove "free oil" only, leaving the "residual oil" and the thiamine in the whole brown rice, the "residual oil" being the major amount of the original total oil of the brown rice.

2. The method of stabilizing brown rice which comprises extracting whole brown rice with petroleum ether to remove "free oil" only, leaving the "residual oil" and the thiamine in the whole brown rice, the "residual oil" being the major amount of the original total oil of the brown rice.

3. The method of stabilizing brown rice which comprises extracting whole brown rice with a fat solvent to remove "free oil" content of the rice only, leaving the "residual oil" and the thiamine in the whole brown rice, the "residual oil" being the major amount of the original total oil of the brown rice, and air drying the extracted rice to remove residual fat solvent.

4. The method of claim 3 in which the fat solvent is petroleum ether.

5. The method of claim 3 in which the fat solvent is hexane.

6. In the art of storing rice, the improvement prior to storage: comprising extracting fresh, whole brown rice with a fat solvent to remove the "free oil" only, leaving the "residual oil" in the whole brown rice, and thereafter storing the so treated whole brown rice.

7. The process of claim 6 in which the fat solvent is petroleum ether, the extraction removing about 40% of the total oil in the brown rice.

8. The method of preparing a stable rice product which does not become rancid on storage comprising extracting fresh whole brown rice with a fat solvent to remove the "free oil," leaving the "residual oil" in the rice, the "residual oil" being the major amount of the original total oil content of the brown rice.

9. In the art of preparing stable rice for storage, the improvement comprising extracting fresh whole brown rice, meaning whole rice in a hulled condition, and consisting of the endosperm, the germ, and the bran layers, with a light petroleum fraction fat solvent to remove about 40% of the total oil of the brown rice, leaving the "residual oil" in the whole brown rice and substantially the original thiamine content.

ERNEST B. KESTER.

REFERENCES CITED

The following references are of record in the file of this patent:

UNITED STATES PATENTS

| Number | Name | Date |
| --- | --- | --- |
| 2,314,282 | Levin | Mar. 16, 1943 |

FOREIGN PATENTS

| Number | Country | Date |
| --- | --- | --- |
| 207,542 | Great Britain | of 1923 |

OTHER REFERENCES

Texas Ag. Exp. Sta. Bulletin 191, June 1916, pg. 19.

Jameson, Jour. of Oil & Fat Industry (1926), vol. 3, pages 256–261.